US007937595B1

(12) United States Patent
Kumar et al.

(10) Patent No.: US 7,937,595 B1
(45) Date of Patent: May 3, 2011

(54) INTEGRATED ENCRYPTION/DECRYPTION FUNCTIONALITY IN A DIGITAL TV/PVR SYSTEM-ON-CHIP

(75) Inventors: Nishit Kumar, San Jose, CA (US); Brian Hale Park, San Francisco, CA (US); Zeljko Markovic, San Francisco, CA (US)

(73) Assignee: Zoran Corporation, Sunnyvale, CA (US)

( * ) Notice: Subject to any disclaimer, the term of this patent is extended or adjusted under 35 U.S.C. 154(b) by 1256 days.

(21) Appl. No.: 10/880,293

(22) Filed: Jun. 28, 2004

Related U.S. Application Data

(60) Provisional application No. 60/483,055, filed on Jun. 27, 2003.

(51) Int. Cl.
G06F 11/30 (2006.01)
G06F 12/14 (2006.01)

(52) U.S. Cl. ........ 713/192; 345/519; 345/539; 345/544; 716/138

(58) Field of Classification Search ............ 716/17; 345/519
See application file for complete search history.

(56) References Cited

U.S. PATENT DOCUMENTS

| | | | | |
|---|---|---|---|---|
| 4,723,226 A * | 2/1988 | McDonough et al. | ... | 365/189.02 |
| 5,765,036 A * | 6/1998 | Lim | | 711/147 |
| 6,260,087 B1 * | 7/2001 | Chang | | 710/100 |
| 6,483,344 B2 * | 11/2002 | Gupta | | 326/41 |
| 6,490,714 B1 * | 12/2002 | Kurniawan et al. | | 716/17 |
| 6,697,489 B1 * | 2/2004 | Candelore | | 380/200 |
| 6,704,871 B1 * | 3/2004 | Kaplan et al. | | 713/192 |
| 6,748,456 B1 * | 6/2004 | Dangat et al. | | 710/1 |
| 6,965,675 B1 * | 11/2005 | Trimberger et al. | | 380/277 |
| 7,102,384 B1 * | 9/2006 | Speers et al. | | 326/39 |
| 7,194,627 B2 * | 3/2007 | Cheung et al. | | 713/168 |
| 7,239,706 B1 * | 7/2007 | Wilhelm et al. | | 380/240 |
| 7,293,178 B2 * | 11/2007 | Evans et al. | | 713/192 |
| 7,418,598 B1 * | 8/2008 | Le Quere | | 713/193 |
| 2002/0026502 A1 * | 2/2002 | Phillips et al. | | 709/219 |
| 2002/0037081 A1 * | 3/2002 | Rogoff et al. | | 380/278 |
| 2003/0105906 A1 * | 6/2003 | Zhao | | 710/305 |
| 2003/0131228 A1 * | 7/2003 | Twomey | | 713/153 |
| 2003/0198345 A1 * | 10/2003 | Van Buer | | 380/43 |
| 2003/0229778 A1 * | 12/2003 | Oesterreicher et al. | | 713/150 |

(Continued)

FOREIGN PATENT DOCUMENTS

WO WO 2004002057 A2 * 12/2003

OTHER PUBLICATIONS

Buer et al., "Integrated Security for Digital Video Broadcast", Aug. 1996, IEEE, vol. 42, No. 3, pp. 1-4.*

*Primary Examiner* — Emmanuel L Moise
*Assistant Examiner* — Nadia Khoshnoodi
(74) *Attorney, Agent, or Firm* — Frommer Lawrence & Haug LLP; John W. Branch

(57) ABSTRACT

A system-on-a-chip (SoC) to process digital audio-video content includes one or more input/output (I/O) interfaces to transmit the digital audio-video content to corresponding I/O devices coupled to the SoC and to receive the digital audio-video content from the corresponding I/O devices. The SoC also includes a cryptographic engine to encrypt the digital audio-video content being transmitted via the I/O interfaces to the corresponding I/O devices and to decrypt the digital audio-video content received via the I/O interfaces from the corresponding I/O devices.

13 Claims, 13 Drawing Sheets

U.S. PATENT DOCUMENTS

| | | | |
|---|---|---|---|
| 2004/0055012 A1* | 3/2004 | Kimball et al. | 725/88 |
| 2004/0078584 A1* | 4/2004 | Moroney et al. | 713/189 |
| 2004/0246780 A1* | 12/2004 | Kawahara et al. | 365/185.28 |
| 2004/0250097 A1* | 12/2004 | Cheung et al. | 713/193 |
| 2004/0250273 A1* | 12/2004 | Swix et al. | 725/25 |
| 2005/0177853 A1* | 8/2005 | Williams et al. | 725/81 |
| 2005/0213756 A1* | 9/2005 | Hubert | 380/44 |
| 2005/0249350 A1* | 11/2005 | Kahn et al. | 380/239 |
| 2005/0271204 A1* | 12/2005 | Chu | 380/44 |
| 2006/0045271 A1* | 3/2006 | Helbig et al. | 380/270 |
| 2006/0104438 A1* | 5/2006 | Giraud | 380/28 |
| 2007/0116294 A1* | 5/2007 | Rogoff et al. | 380/278 |

* cited by examiner

INTEGRATED ENCRYPTION/DECRYPTION FUNCTIONALITY IN A DIGITAL TV/PVR SYSTEM-ON-CHIP

RELATED APPLICATIONS

This application claims the benefits of U.S. Provisional Application No. 60/483,055 filed Jun. 27, 2003.

FIELD OF INVENTION

This invention relates to digital video processing, and particularly concerns system and methods for performing encryption/decryption functions on digital content within an integrated audio-video system-on-a-chip.

BACKGROUND

Digital video is being used in an increasing array of applications ranging from personal computers (PC) and videoconferences to digital televisions (TVs), set-top boxes, and personal video recorders (PVR). These varied video systems process content that ranges from cable, satellite, and terrestrial broadcasts to streaming video and video-on-demand over the Internet. Due to wide proliferation of storage and transmission of digital content, studios and content providers are getting increasingly concerned about security of their high-quality digital content. It is highly desired by the content-providing community to prevent unauthorized copying and piracy.

In particular, the fast-growing PVR systems allow consumers to interactively choose high quality content from either broadcast media or video-on-demand, and when to watch it. The PVR systems allow consumers control, management rights, and personalization options on digital content. To enable these features, hours and hours of audio-video content are stored on loosely coupled, long-term, often removable storage media that may be accessible to unauthorized individuals.

Another area of concern is conditional access schemes in set-top boxes that are implemented using a removable Smart Card. When the Smart Card is connected with a smart card interface of a decoder chip, the descrambling keys stored on the Smart Card are moved to the decoder chip, which then uses them to descramble the digital content received from a broadcast medium. No security measures are currently provided to prevent an intruder from obtaining the descrambling keys from the smart card interface of the decoder chip.

SUMMARY OF THE INVENTION

A system-on-a-chip (SoC) is provided to process digital audio-video content.

According to one aspect of the present invention, the SoC includes one or more input/output (I/O) interfaces to transmit the digital audio-video content to corresponding I/O devices coupled to the SoC and to receive the digital audio-video content from the corresponding I/O devices. The SoC also includes a cryptographic engine to encrypt the digital audio-video content being transmitted via the I/O interfaces to the corresponding I/O devices and to decrypt the digital audio-video content received via the I/O interfaces from the corresponding I/O devices.

BRIEF DESCRIPTIONS OF THE DRAWINGS

The present invention is illustrated by way of example, and not limitation, by the figures of the accompanying drawings in which like references indicate similar elements and in which.

DETAILED DESCRIPTION OF THE PREFERRED EMBODIMENT

In the following description, for purposes of explanation, numerous specific details are set forth in order to provide a thorough understanding of the present invention. It will be evident, however, to one skilled in the art that the present invention may be practiced without these specific details.

Systems and methods for performing cryptographic functionality on digital content within an integrated audio-video system-on-a-chip (SoC) are described. In one embodiment, a SoC includes an integrated encryption/decryption engine that can secure digital content being stored on a hard-disk coupled to the SoC, thus providing security for such systems as personal video recorder (PVR) systems. In one embodiment, the integrated encryption/decryption engine operates in an in-line mode when performing the cryptographic functionality for data transferred between memory and a hard disk unit.

In another embodiment, the integrated encryption/decryption engine secures any digital content that is transmitted out of the SoC by encrypting it. The encrypted digital content may be transmitted via such interfaces as Peripheral Component Interconnect (PCI), Serial Peripheral Interface (SPI), Local Bus, Transport-OUT (e.g., to a digital recorder), etc. Likewise, the integrated encryption/decryption engine can decrypt the encrypted digital content retrieved from such interfaces for processing within the SoC. As a result, applications such as home networking, video-on-demand, or the like can be made secure. In one embodiment, the integrated encryption/decryption engine operates in a memory-to-memory (M2M) mode when performing the cryptographic functionality for data transferred to or from the above interfaces. In one embodiment, the integrated encryption/decryption engine operates in the M2M mode and in-line mode concurrently. In another embodiment, the integrated encryption/decryption engine operates in one mode at a time. In one embodiment, when the integrated encryption/decryption engine operates in the M2M mode, it supports two M2M jobs running in parallel (e.g., to perform simultaneous encryption/decryption for two interfaces (e.g., PCI and SPI)).

In yet another embodiment, the integrated encryption/decryption engine provides protection for descrambling keys transmitted from a Smart Card to the SoC, thus enhancing conditional access schemes in set-top boxes or other systems. In one embodiment, the protection is provided using a key common for both the Smart Card and the SoC. The Smart Card uses the common key to encrypt descrambling keys before transmitting them to the SoC, which then decrypts the descrambling keys using the common key before feeding them into an integrated descrambler.

Figure 1:
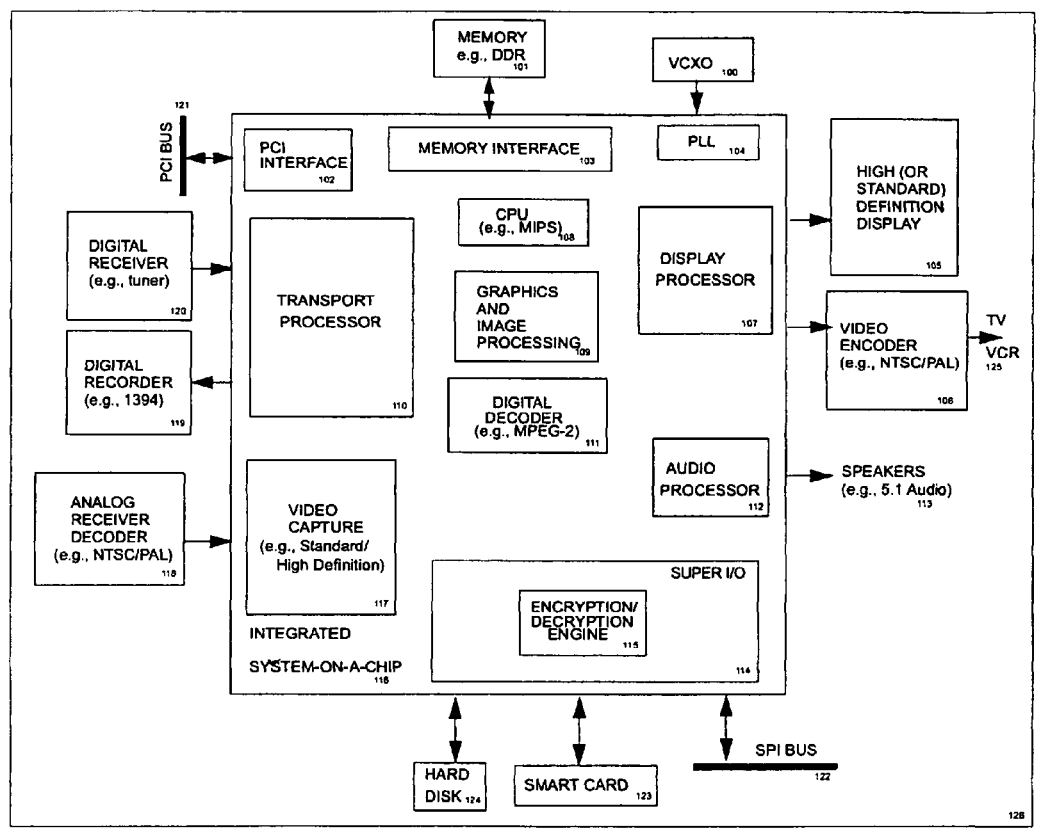
FIG. 1 is a diagram illustrating an exemplary digital audio-video receiver system in which one embodiment of the invention can operate.

FIG. 1 is a block diagram illustrating an exemplary digital audio-video receiver system 126 in which one embodiment of the invention can operate. The receiver system 126 may be used in various audio-video systems (e.g., an integrated digital standard high-definition television, a digital set-top box, a personal video recorder (PVR), etc.). The receiver system 126 may include an integrated system-on-a-chip (SoC) 116, a voltage-controlled crystal oscillator (VCXO) 100, Digital Receiver 120, Digital Recorder 119, Analog Receiver and Decoder 118, Memory 101, hard disk 124, Smart Card 123, Video Encoder 106, and High or Standard Definition Display 105.

VCXO 100 may be responsible for generating the primary clock for the SoC 116. Digital Receiver 120 may be responsible for feeding compressed audio-video transport stream into the SoC 116. Digital Recorder 119 may store compressed audio-video transport stream output by the SoC 116. Analog Receiver and Decoder 118 may feed uncompressed video programs into the SoC 116. Memory 101 may store temporary variables and data required by the SoC 116 and other components within the system. Hard disk 124 may store audio-video content (e.g., for PVR functionalities). Smart Card 123 may provide conditional access keys. Video Encoder 106 may receive uncompressed video from the SoC and create the relevant format for conventional TVs and VCRs.

It should be noted that the receiver system 126 may contain fewer or more components coupled to the SoC 116 than those shown in FIG. 1, depending on the functionalities supported by the receiver system 126.

The SoC 116 is a high-performance processor that performs a variety of audio-video (A/V) processing and storage functions required for various applications (e.g., digital set-top boxes, digital TVs, high-definition TVs, PVRs, etc.).

The primary datapath built within the SoC 116 may take as input a scrambled, multiplexed, and compressed transport stream and produce uncompressed audio-video frames. The descrambling and demultiplexing functions may be performed by the Transport Processor 110, whereas the video decompression may be performed by the Digital Decoder 111. The audio decompression and the associated special effects (e.g., audio crossfade and mixing) may be implemented within the Audio Processor 112. The Display Processor 107 may compose several graphics sources (e.g., background graphics, scaled graphics, cursor, etc.) and video sources (e.g., background video, scaled video, etc.) for the final video output. The Display Processor 107 may provide circuitry for converting the uncompressed video produced by the Digital Decoder 111 into a number of possible display formats (e.g., interlaced, progressive, 16-by-9 display, 4-by-3 display, etc.). The Graphics and Image Processing unit 109 may provide additional scaling and blending functions for video and graphics objects. The Memory Interface 103 may service read/write requests from all the internal modules connected via an internal bus, and interface with external memory 101 (e.g., SDRAM, DDR, etc.). The on-chip integrated CPU 108 may be used to control all the modules within the SoC 116 and to execute the software stack required to make the receiver system work together. The PLL 104 may take in the clock from the external VCXO 100 and generate all the clocks required within the SoC 116 (e.g., memory clock, CPU clock, display clock, core clock, etc.). The SoC 116 of FIG. 1 also contains a Video Capture unit 117 that may provide another source of video content. This unit is used to capture uncompressed video data.

The Super Input/Output unit 114 provides peripheral I/O functions for the SoC. FIG. 1 shows the hard-disk interface, Smart Card interface, and SPI interface. However, the Super Input/Output unit 114 may also support various other peripheral I/O interfaces (e.g., general-purpose input output (GPIO), I2C interfaces, a Local Bus (e.g., to connect a Flash or EEPROM device required for system bootup), etc.).

The Super I/O 114 includes an Encryption/Decryption Engine 115 (also referred to herein as a cryptographic engine). In one embodiment, the engine 115 is responsible for providing security on digital data transmitted across a number of interfaces of the SoC 116. The engine 115 can work in two modes: (a) read from memory and write to memory after performing a cryptographic function (referred to as a Memory-to-Memory mode or M2M mode), and (b) an in-lined mode, performing the cryptographic function for data transferred between the memory and a hard disk unit. In one embodiment, the engine 115 works in the two modes concurrently.

In one embodiment, the in-lined mode provides for encryption of digital content before writing the digital content on the hard disk. Likewise, encrypted content read out of the hard disk is decrypted before writing it into the external memory for further processing by various modules of the SoC 116.

In one embodiment, the memory-to-memory mode provides security for all digital content transmitted on a PCI or SPI Bus 122 or to a Digital Recorder 119. Likewise, whenever encrypted content is received on one of these interfaces, the memory-to-memory mode can be employed to decrypt it.

In another embodiment, the integrated Encryption/Decryption Engine 115 is responsible for providing a secure conditional access. By pairing the SoC 116 with the Smart Card 123 (using a common key such as a paired-key (PK)), all movements of descrambling keys, required by the descrambler in the Transport Processor 110, can also be made secure. For example, the Smart Card 123 may encrypt descrambling keys using the paired-key (PK) before transmitting the descrambling keys to the SoC 116. Encrypted data received by the SoC 116 is decrypted by the Encryption/Decryption Engine 115 using the paired-key (PK) and then fed into the Transport Processor 110 to start descrambling the incoming transport stream.

Figure 2:
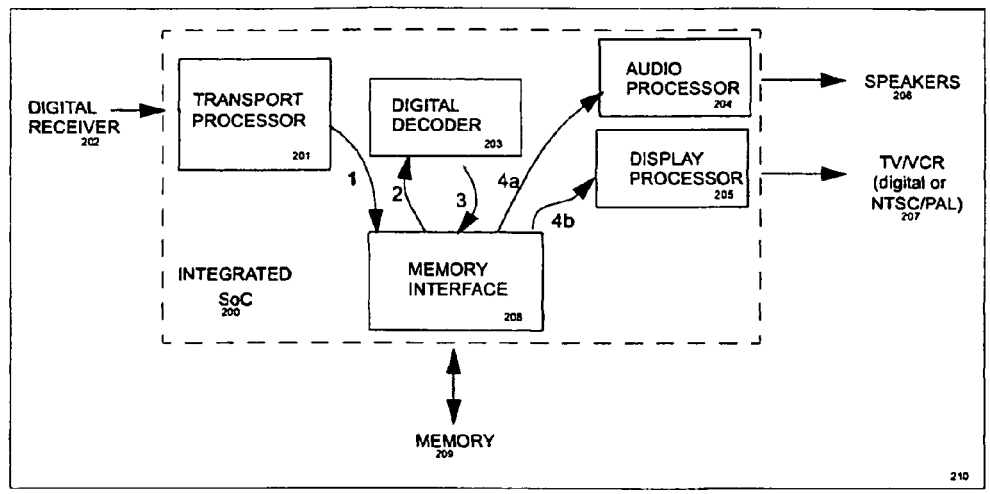
FIG. 2 illustrates an exemplary data-flow within an integrated SoC.

FIG. 2 illustrates an exemplary data-flow within an integrated SoC 200. Referring to FIG. 2, communication between the Transport Processor 201 and the Digital Decoder 203 passes through the Memory Interface 208 and external Memory 209. That is, while the Transport Processor 201 is demultiplexing a transport stream and writes demultiplexed programs into several memory buffers (e.g., video streams, audio streams, Electronic Program Guide data, etc), the Digital Decoder 203 gets its input from one of the video buffers, controlled by the user. Likewise the Audio Processor 204 decompresses audio data from one of the audio buffers in the Memory 209 and streams audio frames out to a speaker 206. The output of the Digital Decoder 203 is written into Memory 209 and subsequently read by the Display Processor 205 to generate the final video output(s) 207.

Figure 3:
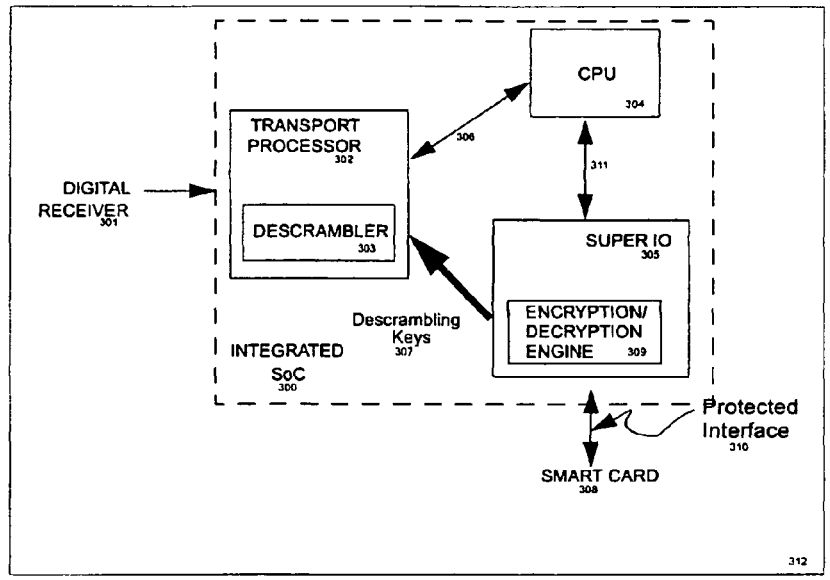
FIG. 3 illustrates an exemplary data-flow and control-flow within an integrated SoC when conditional access is provided.

FIG. 3 illustrates an exemplary data-flow and control-flow within an integrated SoC 300 when secure conditional access is provided. Referring to FIG. 3, a Transport Processor 302, a CPU 304, and a Super IO 305 unit work together to provide conditional access. In one embodiment, the Transport Processor 302 includes a Descrambler 303 to descramble a transport stream received from a Digital Receiver 301. In one embodiment, the transport stream contains certain control packets (with pre-defined Program Packet IDs, PIDs) that carry descrambling key information. These packets are filtered and written out in a memory buffer by the Transport Processor 302 for the security software in the CPU 304 to examine.

In one embodiment, the CPU 304 communicates with the Super I/O 305 to obtain descrambling keys through the Smart Card 308 interface of the SoC 300. Using the Encryption/Decryption Engine 309, the movement of descrambling keys across the Smart Card interface 310 can be made secure, as described earlier. In one embodiment, the descrambling keys are programmed in the Transport Processor 302 by the Super I/O 305, using a private and dedicated direct memory access (DMA) channel 307.

Figure 4:
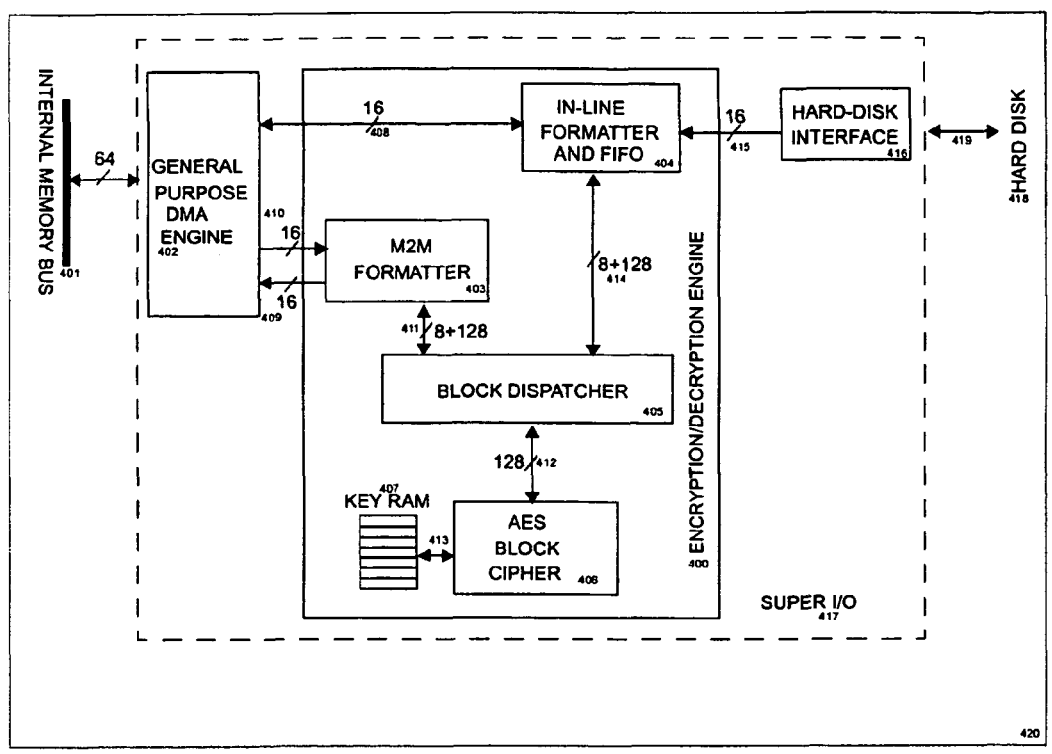
FIG. 4 is a block diagram of one embodiment of an Encryption/Decryption Engine (ENDEC)

FIG. 4 is a block diagram of one embodiment of an Encryption/Decryption Engine (ENDEC) 400. The ENDEC 400 residing within a Super I/O 417 is coupled to Memory 401 on one side (via the internal memory bus of the SoC), and to the hard-disk interface 416 on the other side. As described earlier, in one embodiment, the ENDEC 400 supports two modes of operation: (1) Memory-to-Memory (M2M) mode of operation, in which the ENDEC 400 reads data from memory 410 and writes back to the memory 409 after performing encryption/decryption, and (2) in-lined mode, in which memory 401 and hard-disk 418 are on the two opposite sides of the ENDEC 400. In one embodiment, the two modes of operation are run concurrently. Concurrent operation allows the ENDEC 400 to prevent starvation of M2M jobs due to the slow hard-disk jobs (e.g., data-transfers over the hard-disk interface 416 can be an order-of-magnitude slower than throughput of the ENDEC engine 400).

In another embodiment, the ENDEC 400 runs one mode at a time. In one embodiment, when the ENDEC 400 operates in the M2M mode, it supports two M2M jobs running in parallel (e.g., to perform simultaneous encryption/decryption for two interfaces (e.g., PCI and SPI)).

In one embodiment, a General Purpose DMA Engine 402 coupled to the ENDEC 400 simultaneously supports DMA channels required by the ENDEC 400. The DMA channels may include memory read 408 or write 408 for the in-lined mode, memory read 410 for the M2M mode, and memory write 409 for the M2M mode.

As shown in FIG. 4, the hard-disk DMA channel 419 may be bi-directional to allow the ENDEC 400 to be in the in-line module between hard disk 418 and memory 401. For decryption, this path may start from the hard disk 418, pass through the Hard-Disk Interface 416, and then continue on a 16-bit bus 415. Once inside the ENDEC 400, an In-Line Formatter 404 may buffer data and pack it into appropriate data blocks.

A block cipher 406 is responsible for encrypting/decrypting these data blocks. In one embodiment, the block cipher 406 is a symmetric block cipher 406 that encrypts/decrypts 128-bit blocks of data at a time according to the 128-bit key/128-bit data version of the Advanced Encryption Standard (AES) cryptography scheme. In one embodiment, the AES cryptography scheme is implemented based on Rijndael's algorithm selected by the National Institute of Standards and Technology (NIST). In this embodiment, the AES algorithm prescribes 11 iterations to derive 11 intermediate key values, called Round Keys, which are used by the cipher algorithm in 11 different iterations. The 11 Round Keys include the original key and 10 other derived keys, each 128 bits wide. For encryption, the i-th Round Key is used for i-th iteration of the cipher algorithm, where $1<=i<=11$. For decryption, the (12−i)-th Round Key is used for the i-th iteration. This implies that the first iteration of decrypting a block requires all 11 iterations of the Round Key generation to have been executed.

In one embodiment, the above asymmetry in the algorithm is addressed by pre-computing and storing all Round Keys in an internal RAM 407. As a result, both encryption and decryption can be executed in the same number of cycles. The pre-computation of Round Keys (also referred to as expanded keys) is incurred once for a DMA data transfer, which may typically contain a large number of blocks. For example, a DMA data transfer associated with a single television program (that may sum up to Megabytes of data) uses a single unique key value, and the key expansion has to be performed only once in the beginning of the encryption or decryption of the whole program. Once the Round Keys are pre-computed and stored, they are reused for all the blocks in that program. The use of pre-stored Round Keys requires one additional cycle for a RAM read operation, thereby allowing a 128-bit block to be encrypted or decrypted in 12 cycles instead of 11. At 100 MHz core-clock, this may imply an encryption/decryption throughput of 1.07 Gigabits/second=[(100 MHz)*(8 bits/byte)*(16 bytes/block)/(12 cycles/block)].

As a result, performance is improved and the constraints on the circuit depths are reduced. Both the key-expansion circuitry and the cipher circuitry have to meet constraints of a single clock cycle only independently, since they are not cascaded together. Reduced time-constraints on circuit depth allow a circuit to be synthesized to a smaller area on the silicon die. Furthermore, such an implementation also burns less power because the key expansion circuitry toggles only for short periods of time.

In one embodiment, in which the above AES cryptography scheme is used, the In-line Formatter 404 packs data into 128 bit-wide blocks for the AES Block Cipher 406. In one embodiment, the In-line Formatter 404 also adds an 8-bit "proprietary" control flag for each block, as will be discussed in more detail below. Further, the Block Dispatcher 405 may decode the control flag and send the 128-bit data block to the AES Block Cipher 406 for the appropriate operation to be performed.

When the Block Cipher 406 decrypts the data, it travels back through Block Dispatcher 405 and In-line Formatter 404 to the Memory via the internal memory bus 408. For encryption, the path is similar except that it starts from memory 401 and ends in the hard-disk 418.

The two M2M channels operate in a similar fashion. The 16-bit chunks of data are sent to the M2M Formatter 403, which packs a number of these chunks to form an appropriate 128-bit payload for the AES Block Cipher 406. The control information is also encoded into an 8-bit FLAG. Similar to the in-line mode, the Block Dispatcher 405 decodes the FLAG and sends the 128-bit block to the AES Block Cipher 406 for the encryption/decryption operation. The data is written back to Memory 401 in a symmetrical manner.

The In-line channel 408 may be limited by the hard-disk throughput (e.g., 100 MB/s theoretical max). In one embodiment, the width of the bus 415 between the Hard-Disk Interface 416 and the ENDEC 400 is 16 bits, according to a hard-disk interface standard being used. In one embodiment, in which the Super IO 417 contains a 16-bit general-purpose micro-controller that controls all the I/O sub-modules, the M2M buses 409 and 410 are each 16 bits wide as well.

Figure 5A:
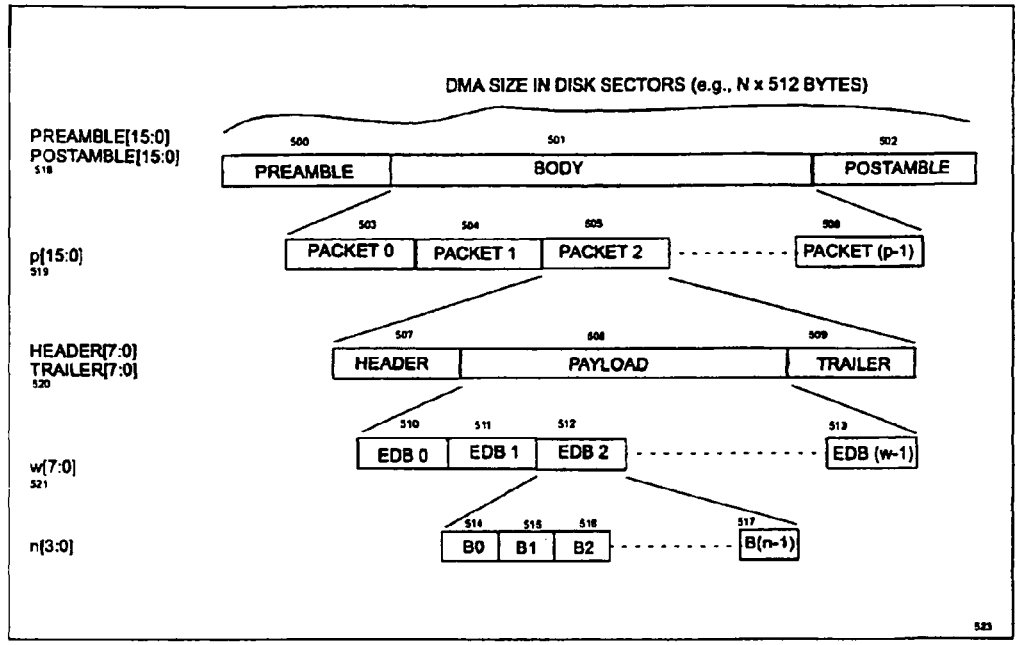
FIG. 5A illustrates one embodiment of a scheme for specifying parameters for an arbitrary DMA operation.

FIG. 5A illustrates one embodiment of a scheme for specifying parameters for an arbitrary DMA operation. This scheme may not only support the arbitrary alignment restrictions imposed by external storage (e.g., DMA chunks to be stored on a hard-disk may need to be a multiple of a 512-byte sector) but also provide flexibility to encrypt/decrypt only certain portions of fixed-size packets within the DMA data transfer (e.g., each fixed-size packet may require a fixed size header and footer to be left untouched).

In one embodiment, a DMA data transfer through the ENDEC 400 consists of three sections: PREAMBLE 500, BODY 501 and POSTAMBLE 502. The sum total of these three sections is constrained to be a multiple of a certain sector size (e.g., 512 bytes). The PREAMBLE 500 and POSTAMBLE 502 may be multiples of 16 bits and pass through the ENDEC 400 unmodified. One exemplary usage of these two sections 500 and 502 is for storing (in clear) the side-channel information coupled with video content to be stored on the hard-drive. The BODY 501 is sectioned into packets of equal size. The maximum number of packets may be 0xFFFF. Each packet may contain a HEADER 507, PAYLOAD 508 and TRAILER 509. Similar to the PREAMBLE 500 AND POSTAMBLES 502, the HEADER 507 and TRAILER 509 may be multiples of 16-bits and may also be left un-encrypted/un-decrypted. The PAYLOAD 508 may be further divided into Encryption Data Blocks (EDBs) 510 through 513 which are the elemental data units to which encryption/decryption is applied. In one embodiment, the size of an EDB is programmable, in order to accommodate block sizes for future algorithms. The programmability allows the ENDEC 400 to take full advantage of its position in the data-path between the source stream and the destination. It can process arbitrary DMA transfers that can account for different packetization schemes (e.g. MPEG, DirecTV, etc.) and provide sector alignment for an external storage device.

Let us take as an example a PVR system that receives a 130-byte/packet DirecTV transport stream for storage on hard disk, with only part of a transport packet needing to be encrypted. These parameters may be programmed via control parameters allowing the ENDEC 400 to process the stream. A DirecTV packet contains 2 bytes of HEADER 507 and no TRAILER 509. That allows us to define 8 EDBs per packet of 16 bytes each. Let us also assume that the DMA transfer to the hard disk contains 10,000 packets and a side-channel annotation of 1 Kilobyte. A PREAMBLE 500 of 1 Kilobyte to store side-channel information and a POSTAMBLE 502 of 48 bytes makes the full DMA transfer size to be a multiple of a sector size of 512 bytes. That is, DMA transfer size=(1024+1000*130+48)=131072 bytes or 256 sectors of 512 bytes.

Figure 5B:
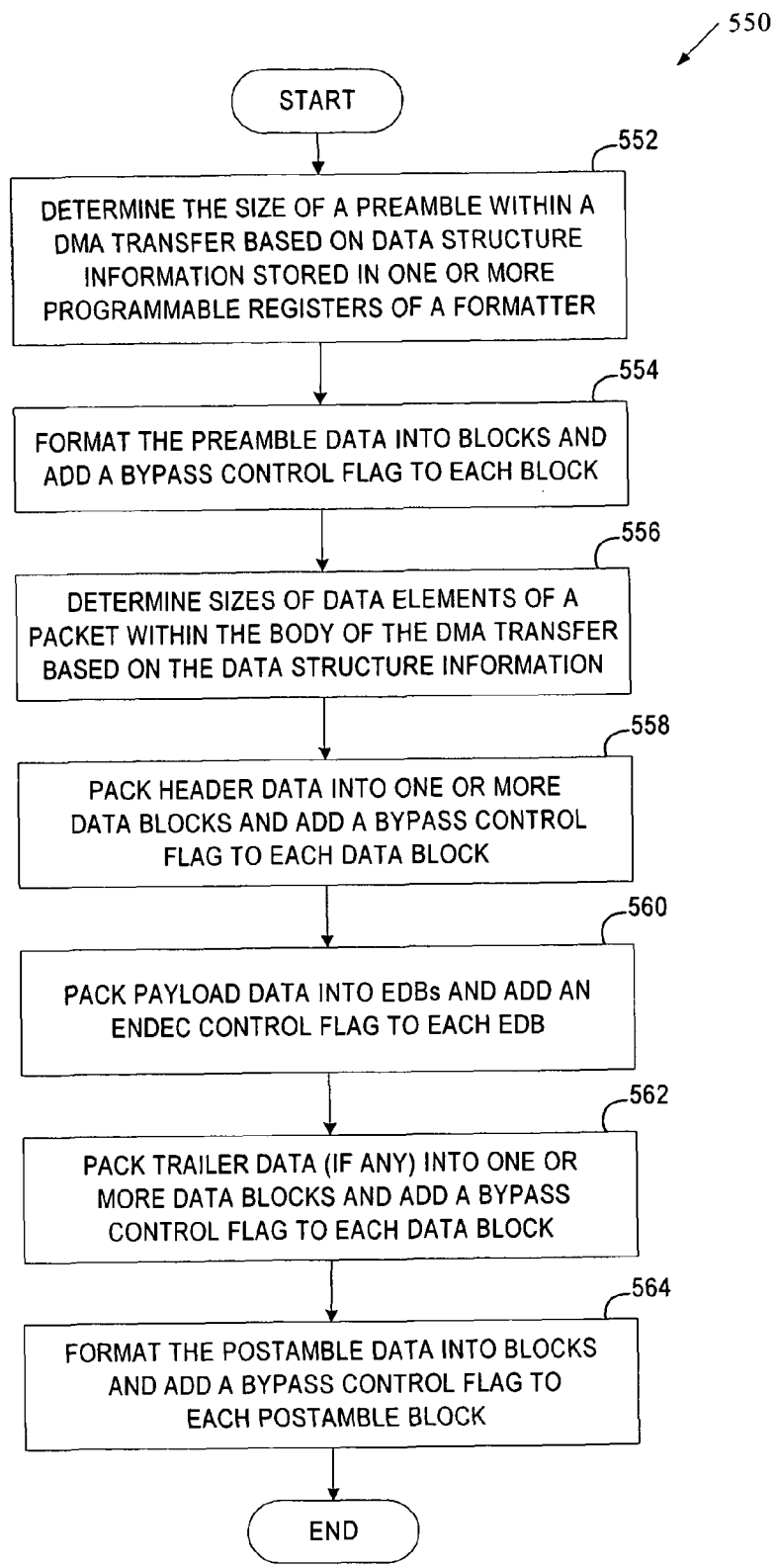
FIG. 5B is a flow diagram of one embodiment of a process for formatting digital audio-video content received by ENDEC 400.

FIG. 5B is a flow diagram of one embodiment of a process 550 for formatting digital audio-video content received by the ENDEC 400. Process 550 may be performed by processing logic that may comprise hardware (e.g., circuitry, dedicated logic, programmable logic, microcode, etc.), software (such as run on a general purpose computer system or a dedicated machine), or a combination of both. Process 550 may be performed by In-line Formatter 404 or M2M Formatter 403.

Referring to FIG. 5B, process 550 begins with processing logic determining the size of a preamble within the content of a DMA data transfer based on data structure information stored in one or more programmable registers of a formatter (processing block 552). The data structure information defines various data elements within the content of a DMA transfer. For example, the data structure information may specify sizes of high-level data elements within the content of the DMA transfer (a preamble, a body and a postamble), sizes of data elements of a packet (a header, a payload and a trailer) and the size of an encryption data block (EDB). The data structure information is configurable depending on a packetization scheme associated with the DMA transfer and an alignment requirement of an external storage device storing the digital audio-video content of the DMA transfer.

Next, processing logic formats the preamble data into blocks and adds a bypass control flag to each block (processing block 554). The bypass control flag indicates that a cryptographic function will not be performed for this block.

At processing block 556, processing logic determines sizes of data elements of a packet within the body of the DMA transfer based on the data structure information. The data elements of a packet include a header, a payload and a trailer. Next, processing logic formats each packet by packing header data into one or more data blocks and adding a bypass control flag to each of these data blocks (processing block 558), packing payload data into EDBs and adding an endec control flag to each EDB (processing block 560), and packing trailer data (if any) into one or more data blocks and adding a bypass control flag to each of these data blocks (processing block 562). The endec control flag indicates that a cryptographic function will be performed for this block.

In one embodiment, processing logic adds a number of bytes to be bypassed to each bypass control flag. In one embodiment, processing logic adds to each endec control flag an identifier of a cryptographic function (e.g., encryption or decryption) and an identifier of the location of pre-computed expanded keys.

Further, processing logic formats the postamble data into blocks and adds a bypass control flag to each postamble block (processing block 564).

Figure 6A:
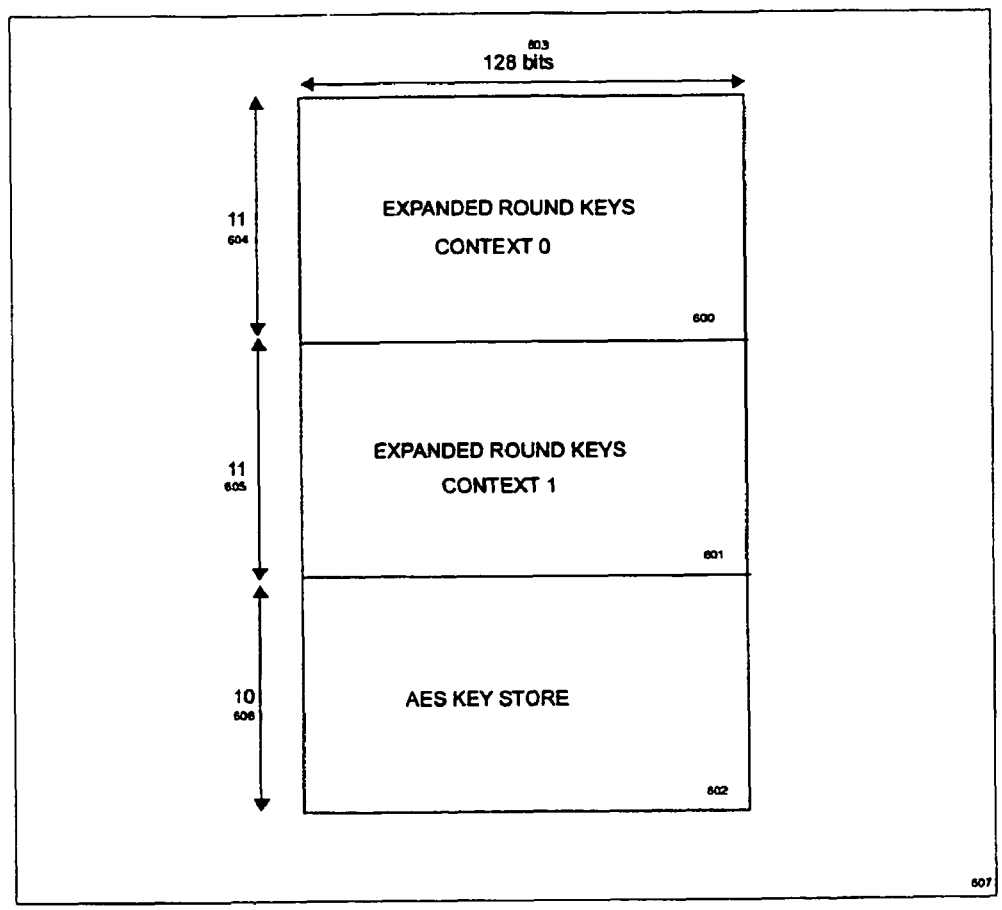
FIG. 6A illustrates one embodiment of a partitioning scheme of an internal Key RAM.

FIG. 6A illustrates one embodiment of a partitioning scheme of a Key RAM 407 of FIG. 4. In one embodiment, the ENDEC 400 supports both the M2M 403 and In-line 404 modes concurrently, and the Key RAM 407 provides storage for each of these two modes. The storage for the two modes is identified as context 600 and context 601. In another embodiment, the Key RAM 407 provides storage for two M2M jobs running in parallel (e.g., through time-slice). Then, each of the contexts 600 and 601 represents storage for one of the two parallel M2M jobs.

Because the AES Block Cipher 406 can be invoked (by the Block Dispatcher 405) with blocks from either of the contexts 600 and 601, Round Keys 600 and 601 may be pre-computed and stored in the Key RAM 407 for each context. Each context 600, 601 may be allocated a storage of 11-by-128 bits to store all 11 Round Keys. These Round Keys (604, 605) may be used in 11 different iterations of the cipher algorithm. The final 10 locations 606 of the 32-by-128 key RAM 407 may be reserved for long-term storage of 10 unexpanded keys 606. For any new DMA transfer, one of these initial 10 keys 606 can generate the 11 round keys to be used for data encryption/decryption.

The ENDEC 309, 400 can be provided with an initial key in one of two ways: (a) through the 128-bit data bus 412 that is input to the AES Block Cipher 406, or (b) by retrieving a key from one of the 10 slots 606 reserved at the bottom of the Key RAM 407. The advantage of having to access the keys via the internal Key RAM 407 is security. Once these values are written to the internal RAM 407 at the beginning of the session, it is impossible to externally obtain these Keys, since only the AES Block Cipher 406 has access to the Key RAM.

Figure 6B:
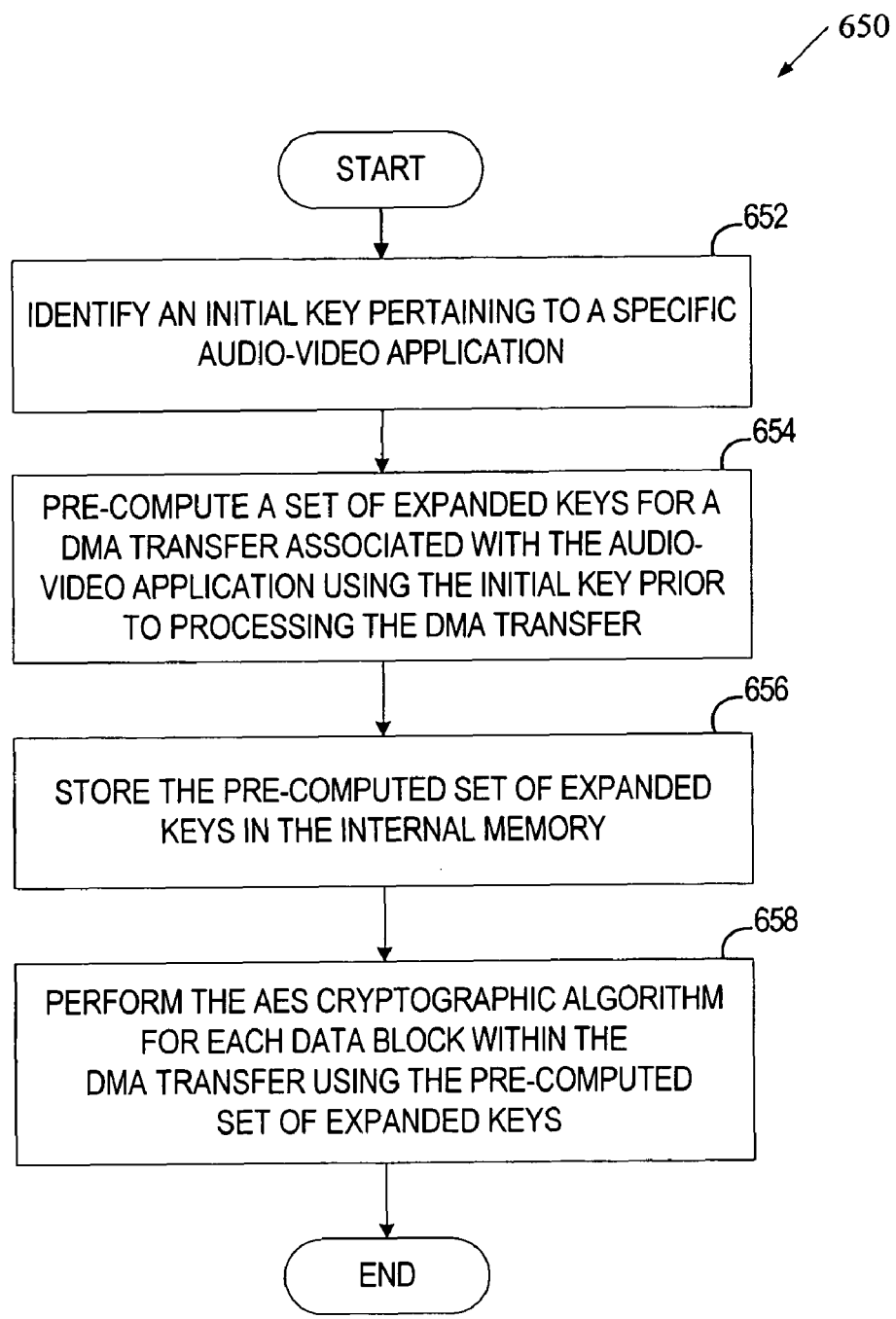
FIG. 6B is a flow diagram of one embodiment of a process for creating a set of expanded keys for use by an AES cipher.

FIG. 6B is a flow diagram of one embodiment of a process 650 for creating a set of expanded keys for use by an AES cipher. Process 650 may be performed by processing logic that may comprise hardware (e.g., circuitry, dedicated logic, programmable logic, microcode, etc.), software (such as run on a general purpose computer system or a dedicated machine), or a combination of both. Process 650 may be performed by AES Block Cipher 406.

Referring to FIG. 6B, process 650 begins with processing logic identifying an initial key pertaining to a specific audio-video application (processing block 652). In one embodiment, the initial key is identified by reading the initial key from the internal memory. In another embodiment, the initial key is received on a data input bus.

Next, processing logic pre-computes a set of expanded keys for a DMA transfer associated with the audio-video application using the initial key prior to processing the DMA transfer (processing block 654) and stores the pre-computed set of expanded keys in the internal memory (processing block 656). In one embodiment, processing logic stores the pre-computed set of expanded keys in one of two sections of the internal memory, depending on the type of the DMA transfer. The type of the DMA transfer may be either an M2M DMA transfer or an in-line DMA transfer. Alternatively, the type of the DMA transfer may be a DMA transfer processed by a first M2M job or a DMA transfer processed by a second M2M job. The two sections of the internal memory are context 0 and context 1 as discussed in more detail below.

Further, processing logic performs the AES cryptographic algorithm for each data block within the DMA transfer using the pre-computed set of expanded keys (processing block 658).

Figure 7A:
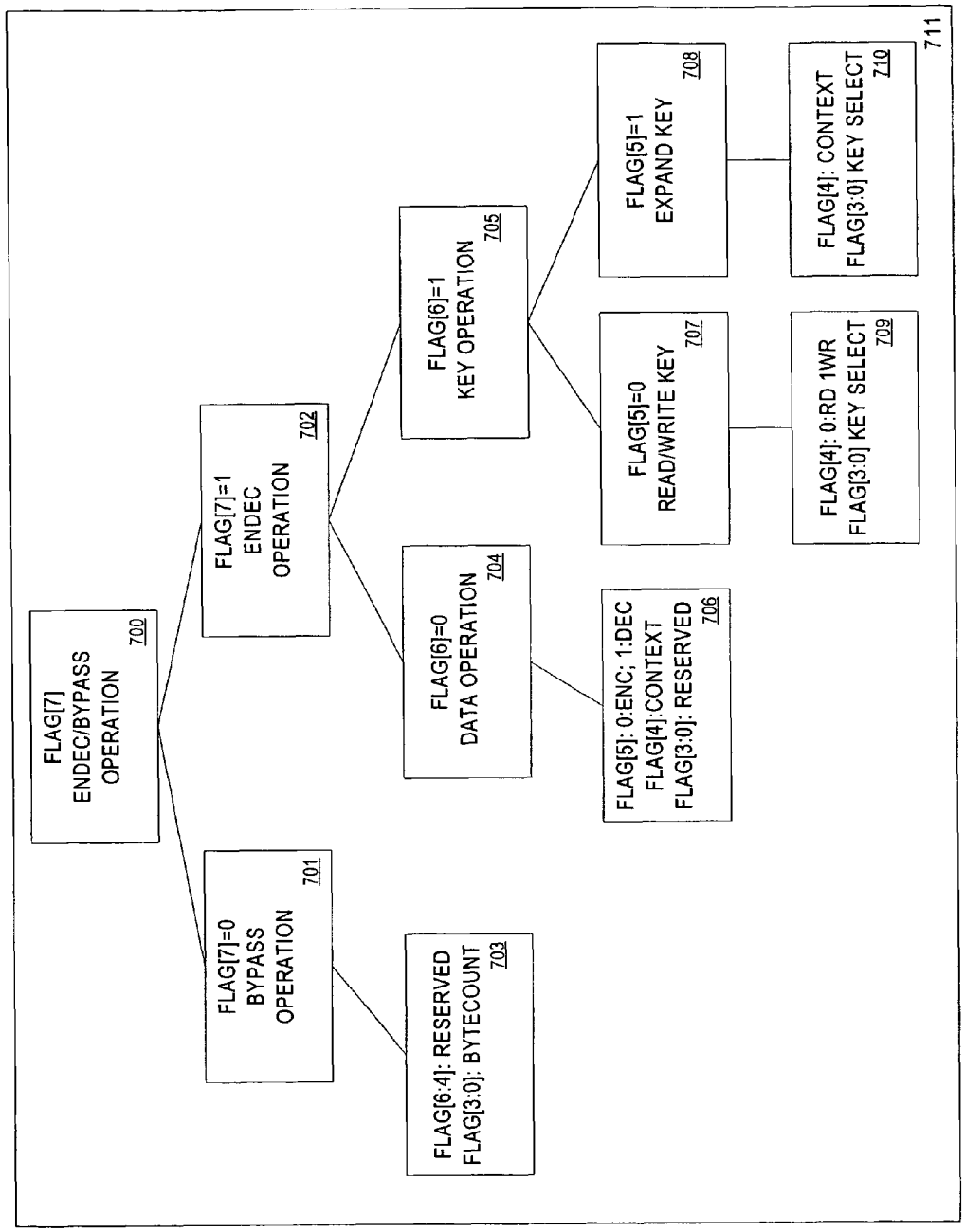
FIG. 7A illustrates control FLAGS used by modules within an ENDEC, according to one embodiment of the present invention.

FIG. 7A illustrates control FLAGS used by modules within the ENDEC 400, according to one embodiment of the present invention.

FLAG[7]=0 701: If a block of data is required to be bypassed, FLAG[7] 700 is set to 0. The number in FLAG[3:0] 703 indicates the number of bytes that must pass through the AES engine unchanged.

FLAG[7]=1 702 indicates an ENDEC operation. In case of non-bypass operations specified by setting FLAG[7] 702 to 1, two types of ENDEC operations are possible: (a) Key-related operations 705 by setting FLAG[6] to 1, and (b) Data-related operations 704 specified by setting FLAG[6] to 0.

FLAG[6]=1 704 indicates a key-related operation. Reading or writing keys from the Key RAM is specified by setting FLAG[5] to 0 707 and setting FLAG[4] to 0 or 1, respectively 709. This operation stores or retrieves long-term Key values from the 10 slots reserved at the bottom of the Key RAM 407. The slot address is determined by FLAG[3:0] 710. The Super I/O 417 has logic implemented outside the ENDEC 400 to prevent values read out of the Key RAM 407 to be exposed on any external interface of the SoC. The Key Read operations 707 are permitted only within the internal sub-modules of the Super I/O 417.

FLAG[5]=1 (708) indicates Key Expansion. This operation computes the intermediate Round Keys and stores them in the Key RAM 407. A Key Expansion operation needs to be performed before any data operations 706 can occur. FLAG[4] selects either M2M or In-line context 710 to store intermediate Round Keys in either the first 11 locations 600 or the second 11 locations 601. The initial Key value can come from either the input data bus or from one of the 10 Keys stored in the Key RAM. The source is determined by KEY SELECT (FLAG[3:0]) 710.

After the Key expansion 708 completes, data operations occur. For Data-related operations (i.e., FLAG[6]=0), FLAG[5] indicates either an encrypt operation (=0) 706 or decrypt operation (=1) 706. FLAG[4] indicates data context 706 for intermediate Round Keys to be used for the data cipher.

Figure 7B:
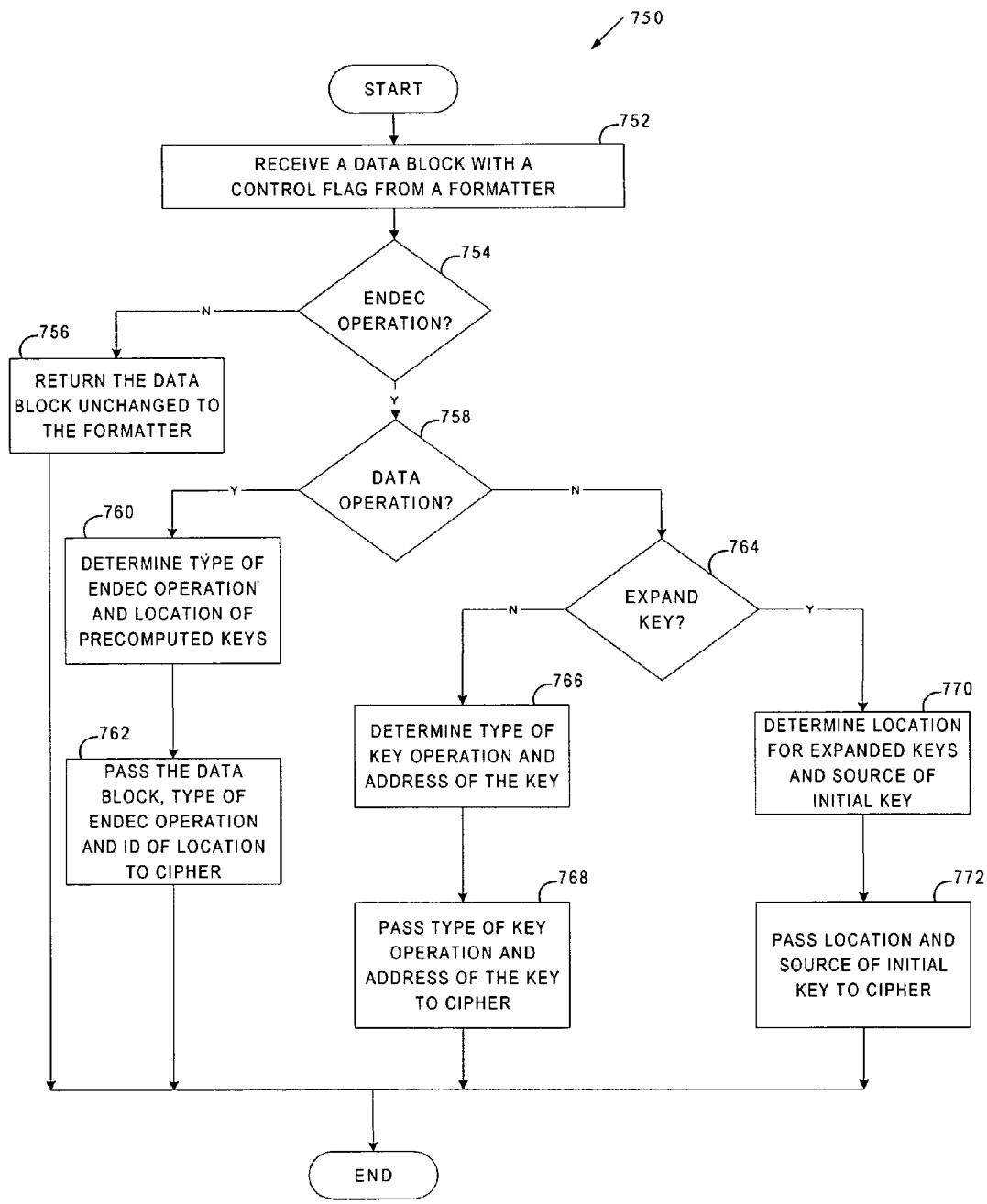
FIG. 7B is a flow diagram of one embodiment of a process for handling data blocks using corresponding control flags.

FIG. 7B is a flow diagram of one embodiment of a process 750 for handling data blocks using corresponding control flags. Process 750 may be performed by processing logic that may comprise hardware (e.g., circuitry, dedicated logic, programmable logic, microcode, etc.), software (such as run on a general purpose computer system or a dedicated machine), or a combination of both. Process 750 may be performed by Block Dispatcher 405.

Referring to FIG. 7B, process 750 begins with processing logic receiving a data block with a control flag from a formatter (processing block 752). At decision box 754, processing logic determines whether the data block is to be subjected to a cryptographic operation using the control flag (e.g., bit 7 of the control flag). If not, processing logic returns the data block unchanged to the formatter (processing block 756) and process 750 ends. If so, processing logic determines whether the cryptographic operation is a data operation or a key operation using the control flag (e.g., bit 6 of the control flag) (decision box 758).

If the cryptographic operation is a data operation, processing logic uses the control flag to determine the type of the data operation (encryption or decryption) (e.g., using bit 5 of the control flag) and the location identifier (e.g., context 0 or context 1) for the set of pre-computed keys to be used for the operation (e.g., using bit 4 of the control flag) (processing block 760). The, processing logic passes the data block, the type of the operation and the location identifier of the pre-computed keys to the AES cipher (processing block 762).

If the cryptographic operation is a key operation, processing logic further determines whether it is an expand key operation using the control flag (e.g., bit 5 of the control flag) (decision box 764). If so, processing logic uses the control flag to determine the location identifier for storing expanded keys (e.g., using bit 4 of the control flag) and the source of the initial key to be used for pre-computing the expanded keys (e.g., using bits 3-0 of the control flag) (processing block 770). Next, processing logic passes the location identifier for the expanded keys and the source of the initial key (e.g., the slot address of the initial key stored in the AES memory or the initial key received on the input data bus) to the AES cipher (processing block 772).

If the key operation is an access key operation, processing logic uses the control flag to determine the type (e.g., read or write) of the access key operation (e.g., using bit 4 of the control flag) and the slot address of the initial key to be accessed (e.g., using bits 3-0 of the control flag) (processing block 766). Next, processing logic passes the type of the access key operation and the slot address of the initial key to the AES cipher (processing block 768).

The AES Block Cipher's 406 I/O characteristics will now be described using FIGS. 8-11.

Figure 8:
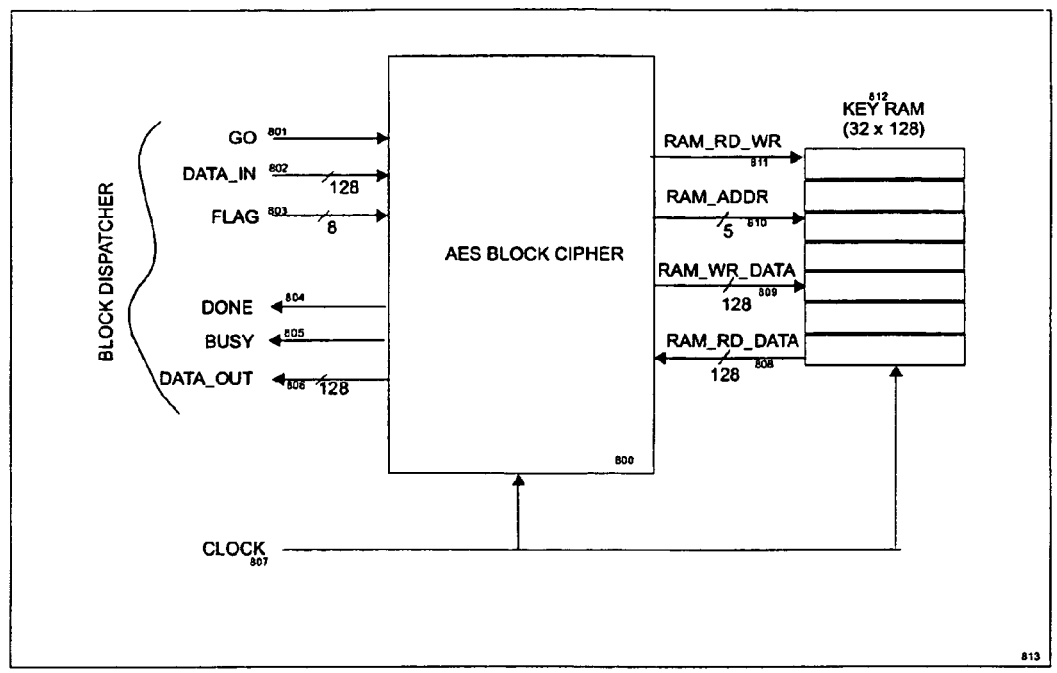
FIG. 8 illustrates one embodiment of interface specification for an AES Block Cipher.
Figure 9:
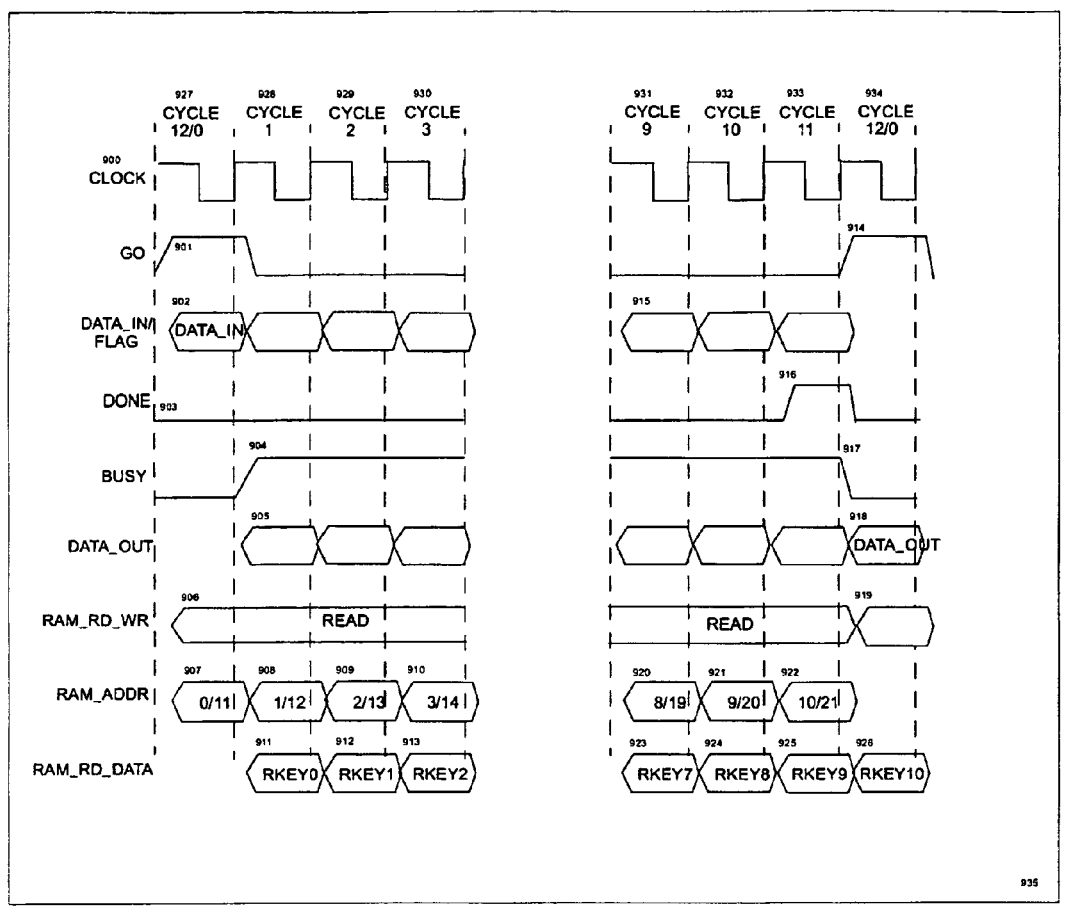
FIG. 9 illustrates one embodiment of an AES encryption/decryption sequence.

Beginning with FIGS. 8 and 9, an AES encryption/decryption sequence is initiated by assertion of the GO signal 801, 901 from the Block Dispatcher 405. In the same clock cycle, the 128-bit DATA_IN 802, 902 is provided and latched by the AES Block Cipher 800. The Block Cipher 800 then outputs the READ request on the RAM_RD_WR line 811, 906 along with the 5-bit RAM_ADDR 810, 907. The starting value for the RAM_ADDR 907 depends on which context was chosen for this particular block, 0 for context 0 or 11 for context 1. In the following cycle, the BUSY 805, 904 signal is asserted to prevent another request from the Block Dispatcher 405 and the first Round Key value 808, 911 is returned from the Key RAM. The 11 iterations of the AES cipher are executed in 11 consecutive cycles. During the next-to-final iteration, the DONE signal 804, 916 is asserted to the Block Dispatcher 405. Finally, the BUSY is de-asserted 917 and the encrypted/decrypted data is sent on the 128-bit DATA_OUT bus 806, 918.

Figure 10:
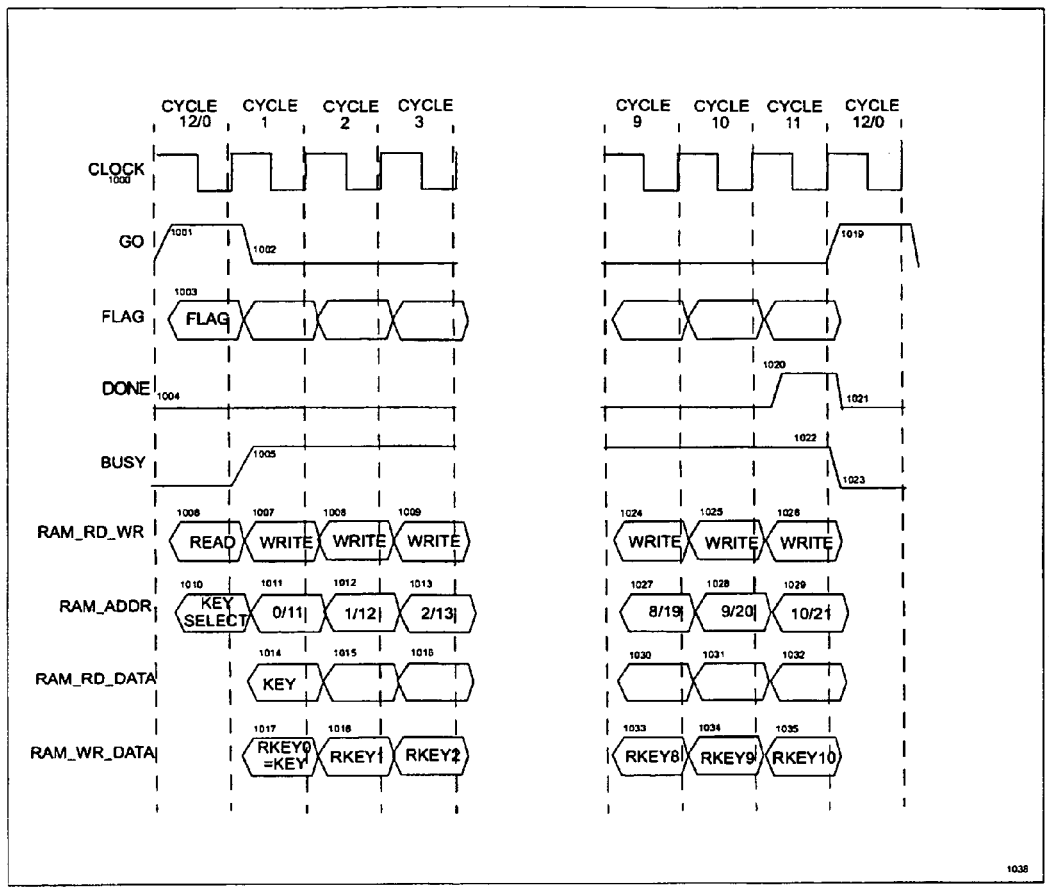
FIG. 10 illustrates one embodiment of an AES key expansion sequence.

The AES Key Expansion sequence, illustrated in FIG. 10, is similar to the encrypt/decrypt operation. The sequence is initiated upon assertion of the GO signal 1001. A read request is posted on the RAM_RD_WR line 1006 and depending on the key source specified in FLAG[3:0], the 5-bit RAM_ADDR 1010 is updated. As mentioned previously, the key source could be one of the following:

(a) value stored at the start of Context 0 600, i.e., address=0;
(b) value stored at the start of Context 1 601, i.e., address=11;
(c) one of the 10 values from AES Key Store 602 at the bottom of the Key RAM 407, i.e., address=22 through 31.

In the following cycle, the BUSY 1005 and write request on RAM_RD_WR 1007 are asserted and held for the next 10 key expansion stages. The Round Key values are output from the AES Block Cipher 406 on the 128-bit RAM_WR_DATA 1017 bus and written to the appropriate slots in the Key RAM 407. During the last stage, the DONE is asserted 1020.

Figure 11:
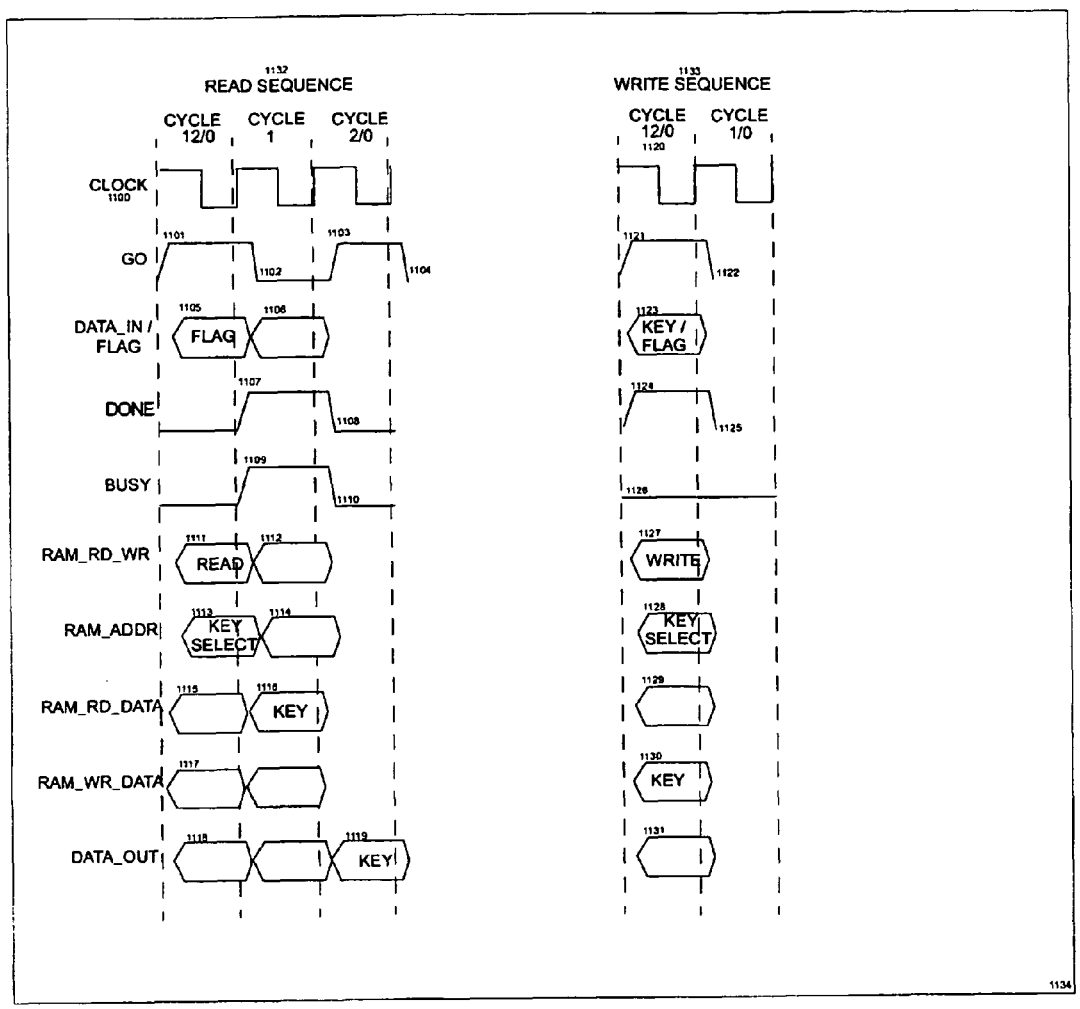
FIG. 11 illustrates one embodiment of an AES key read/write sequence.

FIG. 11 shows the Key read/write sequences. Upon receiving the GO 1101 and FLAG 1105 for the Key read operation 1132, the RAM_RD_WR posts a read request 1111 and provides the RAM_ADDR 1113. The AES Block Cipher 406 outputs a DONE 1107 and BUSY 1109 for one cycle and the Key value is output the following cycle on DATA OUT 1119. The write sequence 1133 occurs all in the same cycle as the GO 1121 and a BUSY is never output 1126.

Thus, a method and system for performing encryption/decryption functions on digital content within an integrated audio-video SoC have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system-on-a-chip (SoC) to process digital audio-video content, the SoC comprising:
a plurality of input/output (I/O) interfaces conforming to different communication interface types, to transmit the digital audio-video content to a plurality of I/O devices coupled to the SoC and to receive the digital audio-video content from the plurality of I/O devices coupled to the SoC;
a cryptographic engine including a partitioned memory that is configured to store at least one key in each of a plurality of partitions for the partitioned memory that corresponds to a context of received content from each of the plurality of I/O interfaces to encrypt digital audio-video content being transmitted to any of the plurality of I/O devices via any of the plurality of I/O interfaces, wherein the cryptographic engine is arranged to concurrently perform parallel processing of a plurality of encryption functions on the digital audio-video content received from different ones of the plurality of I/O interfaces conforming to different communication interface types, using the at least one key stored in each corresponding partition;
the plurality of I/O interfaces and the cryptographic engine being located on a single integrated circuit chip; and
wherein the cryptographic engine is configured to concurrently operate in an in-line mode when performing a cryptographic function on the digital audio-video content transferred between a memory and a hard drive unit and in a memory-to-memory mode, wherein the memory-to-memory mode is a random access memory to random access memory mode.

2. The SoC of claim 1 wherein the cryptographic engine is to decrypt the digital audio-video content received from any of the plurality of I/O devices via any of the plurality of I/O interfaces.

3. The SoC of claim 2 wherein the cryptographic engine is configured to encrypt and decrypt the digital audio-video content using an Advanced Encryption Standard (AES) cryptographic algorithm.

4. The SoC of claim 3 wherein the cryptographic engine is configured to precompute a set of keys prior to performing a cryptographic function for a direct memory access (DMA) data transfer and to store the pre-computed set of keys in an internal storage.

5. The SoC of claim 4 wherein the cryptographic engine is configured to use the precomputed set of keys when executing the AES cryptographic algorithm for each of a plurality of data blocks within the DMA data transfer.

6. The SoC of claim 4 wherein the data structure of the DMA data transfer is configurable depending on a packetization scheme used for the DMA data transfer.

7. The SoC of claim 4 wherein the data structure of the DMA data transfer is configurable depending on an alignment requirement or restriction of an external storage device that transmits content of the DMA data transfer to the SoC.

8. The SoC of claim 1 wherein:
the plurality of I/O interfaces comprise a hard disk interface; and
the digital audio-video content is processed for a personal video recorder (PVR) application.

9. The SoC of claim 1 wherein:
the plurality of I/O interfaces include at least two interfaces selected from the group consisting of: a peripheral component interconnect (PCI), a serial peripheral interface (SPI), a local bus, a transport-out interface, a general purpose input/output (GPIO) interface, and an inter-integrated circuit (I2C) interface; and
the digital audio-video content is processed for any one of a home-networking application and a video-on-demand application.

10. The SoC of claim 9 wherein the memory-to-memory mode further comprises reading the digital audio-video content from memory, performing a cryptographic function on the digital audio-video content and writing the digital audio-video content to the memory.

11. The SoC of claim 10 wherein the cryptographic engine is configured to perform a cryptographic function in the memory-to-memory mode for two direct memory access (DMA) data transfers in parallel.

12. A system-on-a-chip (SoC) to process digital audio-video content, the SoC comprising, on a single integrated circuit chip:
a video capture unit;
a graphics processor;
an audio processor;

a transport processor to descramble and multiplex scrambled video;
a video decoder to decompress compressed video;
a display processor to convert video into a display format;
a plurality of input/output (I/O) interfaces conforming to different communication interface types, to transmit the digital audio-video content to a plurality of I/O devices coupled to the SoC and to receive the digital audio-video content from the plurality of I/O devices; and
a cryptographic engine including a partitioned memory that is configured to store at least one key in each of a plurality of partitions for the partitioned memory that corresponds to a context of received content from each of the plurality of I/O interfaces to encrypt digital audio-video content being transmitted to any of the plurality of I/O devices via any of the plurality of I/O interfaces, wherein the cryptographic engine is arranged to concurrently perform parallel processing of a plurality of encryption functions on the digital audio-video content received from different ones of the plurality of I/O interfaces conforming to different communication interface types, using the at least one key stored in each corresponding partition; and
wherein the cryptographic engine is configured to concurrently operate in an in-line mode when performing a cryptographic function on the digital audio-video content transferred between a memory and a hard drive unit and in a memory-to-memory mode, wherein the memory-to-memory mode is a random access memory to random access memory mode.

13. The SoC of claim 12 wherein:
the memory-to-memory mode further comprises reading the digital audio-video content from a memory, performing a cryptographic function on the digital audio-video content and writing the digital audio-video content to the memory.

* * * * *